United States Patent [19]

Rehfeld

[11] 4,137,989
[45] Feb. 6, 1979

[54] ROTARY HYDRAULIC SERVO FOR STEERING GEAR

[75] Inventor: Frederick L. J. Rehfeld, Saginaw, Mich.

[73] Assignee: General Motors Corporation, Detroit, Mich.

[21] Appl. No.: 840,919

[22] Filed: Oct. 11, 1977

[51] Int. Cl.² ................................. B62D 5/10
[52] U.S. Cl. ......................... 180/148; 91/375 A; 418/129; 418/174
[58] Field of Search ............. 180/148, 149; 91/376 A, 91/375 A; 418/174, 129, 128, 125

[56] References Cited

U.S. PATENT DOCUMENTS

| | | | |
|---|---|---|---|
| 1,944,700 | 1/1934 | Tait | 180/149 |
| 1,947,991 | 2/1934 | Jessup | 180/149 X |
| 3,616,727 | 11/1971 | Suzuki | 91/375 A |
| 3,831,697 | 8/1974 | Wahlmark | 180/148 |

*Primary Examiner*—John A. Pekar
*Attorney, Agent, or Firm*—Charles R. White

[57] ABSTRACT

The rotary hydraulic servo is integral with a steering shaft and comprises a fluid control valve element rotated by manual steering input, and a multi-lobed rotor mounted in a stator. The stator has a set of reciprocally movable radial vanes cooperating with the arcuately spaced lobes of the rotor to form chambers for pressure fluid for operator selected hydraulic drive of the rotor. The rotor is drivingly connected to a pinion meshing with teeth of the rack for right and left turn power assist steering.

4 Claims, 6 Drawing Figures

ROTARY HYDRAULIC SERVO FOR STEERING GEAR

This invention relates to integral power steering systems for vehicles and more particularly to a new and improved rotary hydraulic servo for providing power assist to steering gear such as a rack and pinion gear.

Prior to the present invention a number of rack and pinion steering gear designs incorporated a power cylinder, concentric or axially aligned with the rack, controlled by manual steering input to a separate rotary or other suitable valve for power assisted steering. While such semi-integral designs have provided advancements in power assisted rack and pinion steering the units were generally bulky and cylinder stroke length was such that vehicular use of such power steering was limited. Additionally such power cylinders required considerable quantities of steering fluid for proper operation and necessarily included many possible leak points and required numerous fittings which were costly and detracted from their wide-spread use.

In contrast to the prior constructions this invention incorporates a power steering unit in a steering system having an integral and concentric hydraulic motor and control valve. With this construction a small and highly compact unit is provided to render hydraulic assistance to turn the pinion of a rack or other output for power assist steering. With the valve and motor in a small package, space usage is optimized making the invention particularly desirable for crowded environments such as in small compact vehicles, particularly those with front wheel drive arrangements. With this invention fluid sealing is minimized and the external dynamic seals are low pressure. Further, a reduced amount of oil is required as compared to prior art systems and particularly the prior art power cylinders.

It is an object, feature and advantage of this invention to provide a new and improved integral power steering unit for hydraulically powering an output operatively connected to the steerable wheels of a vehicle.

It is another feature, object and advantage of this invention to provide a new and improved integral power steering gear comprising a rotary hydraulic servo which incorporates a hydraulic valve element integral with and selectively rotated by a manual steering shaft for feeding pressure fluid to a rotor concentric with the valve element and connected to an output for power assisted left or right turn steering operations.

It is another feature, object and advantage of this invention to provide a compact power steering unit which eliminates the prior art power cylinders, which optimizes use of power steering fluid and provides a straightforward means for applying power assist to the pinion of a rack and pinion steering gear.

It is another feature, object and advantage of this invention to provide a new and improved integral rotary hydraulic servo for a power steering gear unit having a fluid control valve connected to and rotated by a steering shaft to selected positions for controlling the feed of pressure fluid to a lobed rotor mounted in a stator having vanes cooperating with the lobes to form pressure chambers and in which the rotor is powered by pressure fluid for the hydraulic power assist drive of an output member.

These and other features, objects and advantages of this invention will be more apparent from the following detailed description and invention in which.

Figure 1:
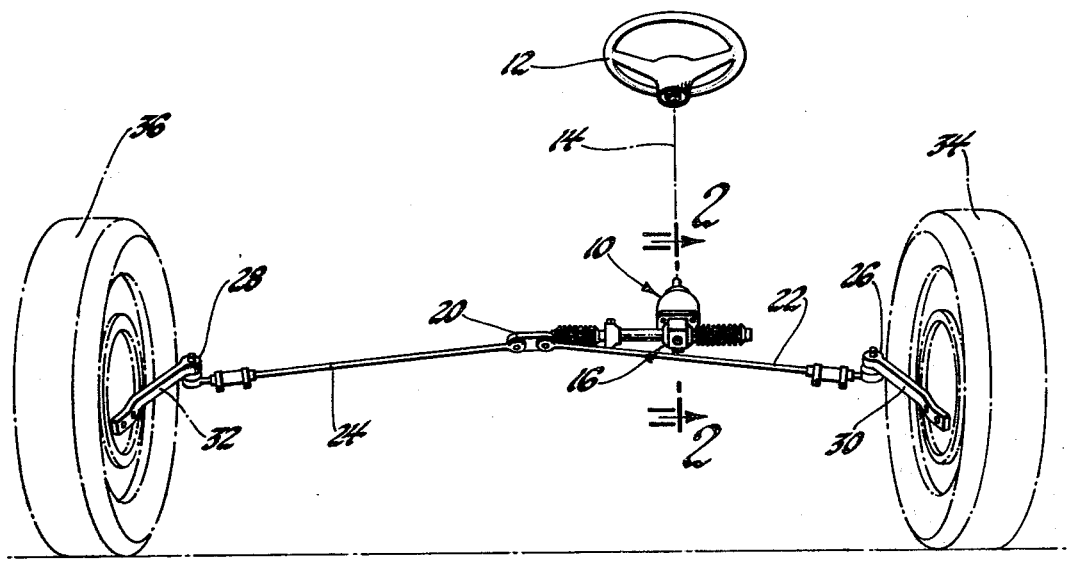
FIG. 1 is a front view diagrammatically illustrating a steering system of a vehicle incorporating power assisted rack and pinion steering.

Turning now in greater detail to the drawing, there is shown in FIG. 1 a power steering gear incorporating a rotary hydraulic servo 10 having a manual rotary input through a conventional hand wheel 12 and steering shaft 14. The output of the rotary hydraulic servo is preferably to a rack and pinion steering gear assembly 16 although other suitable gear units could be alternatively employed.

The rack and pinion assembly has a laterally movable rack 18 as its output which has a connector 20 at its inboard end. Left and right side tie rods 22 and 24 are pivotally connected at their inner ends to connector 20. From such pivot connections the tie rods extend in opposite directions, laterally and forwardly, and have their outboard ends connected by suitable fittings 26, 28 to the ends of left and right steering arms 30 and 32 mounted respectively on left and right steerable wheels 34 and 36.

Figure 2:
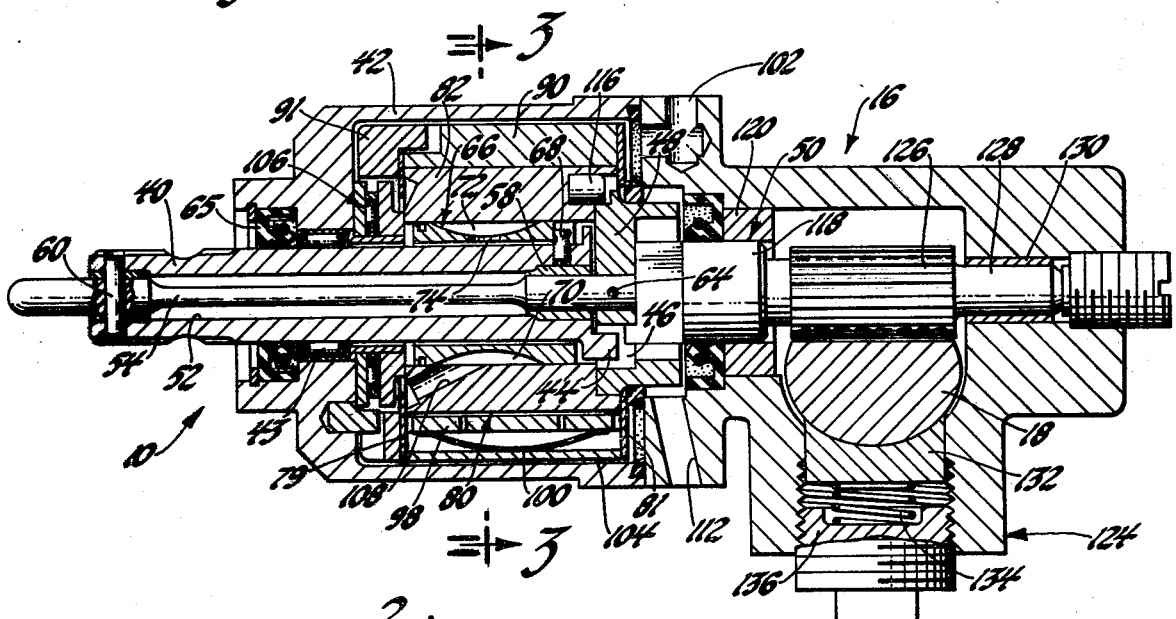
FIG. 2 is a sectional view taken generally along line 2—2 of FIG. 1 and more specifically along lines 2—2 of FIG. 3 illustrating a power steering unit constructed in accordance with the principles of this invention.

FIG. 2 shows the rotary hydraulic servo 10 in cross section as having an elongated stub shaft 40 providing the mechanical input from steering shaft 14 that extends into the servo housing 42. The stub shaft 40 is supported for rotation in housing 42 by bearing 43 and is generally a cylindrical tubular member that extends from a connection with the steering shaft outside of the housing 42 to an interior terminal head portion. The head portion of the stub shaft has arcuately spaced and radially projecting segments 44 extending into and cooperating with arcuate slots 46 in a head portion 48 of an intermediate drive connection member 50 forming part of a lost motion connection. The stub shaft 40 has an elongated axial passage 52 which receives a torsion bar 54 extending therethrough and which is supported for twisting movement therein by bearing 58. The outer end of the torsion bar is secured by pin 60 to the stub shaft 40 while the inner end is fastened to head portion 48 of intermediate connector member 50 by pin 64. Seal 65 disposed between housing 42 and stub shaft 40 prevents leakage of power steering fluid from the housing.

Figure 3:
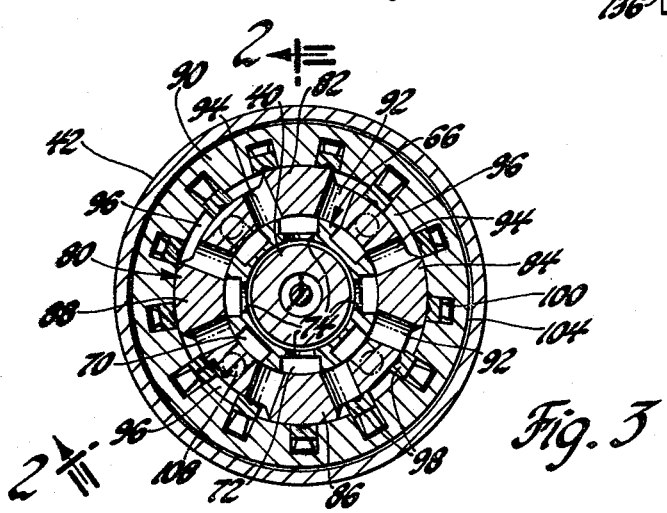
FIG. 3 is a sectional view of the power steering unit of FIGS. 1 and 2 taken along line 3—3 of FIG. 2.
Figure 4:
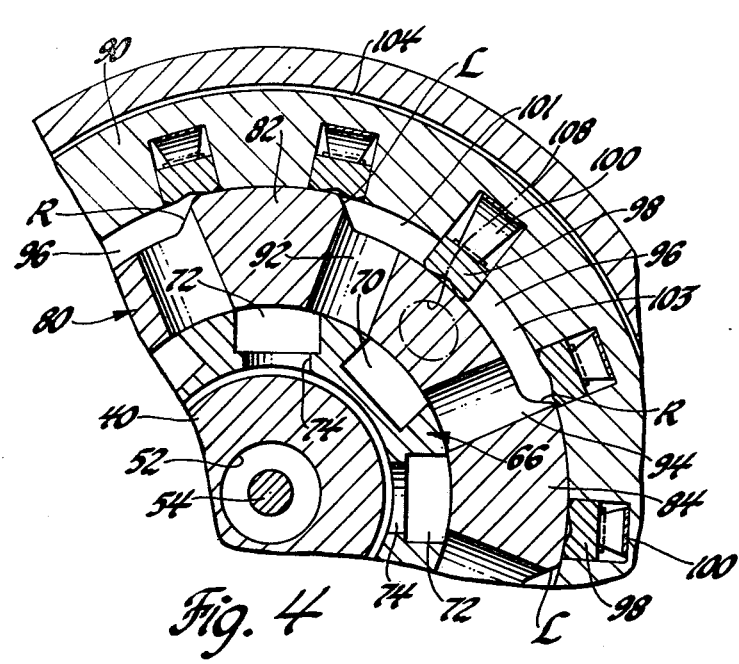
FIG. 4 is an enlarged view of a portion of the unit of FIG. 3 but showing the valve element actuated clockwise.
Figure 5:
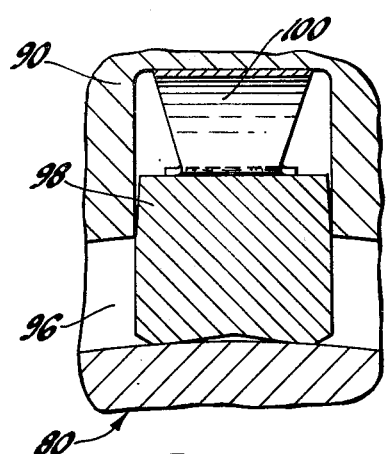
FIG. 5 is an enlarged view of a portion of FIG. 4.
Figure 6:
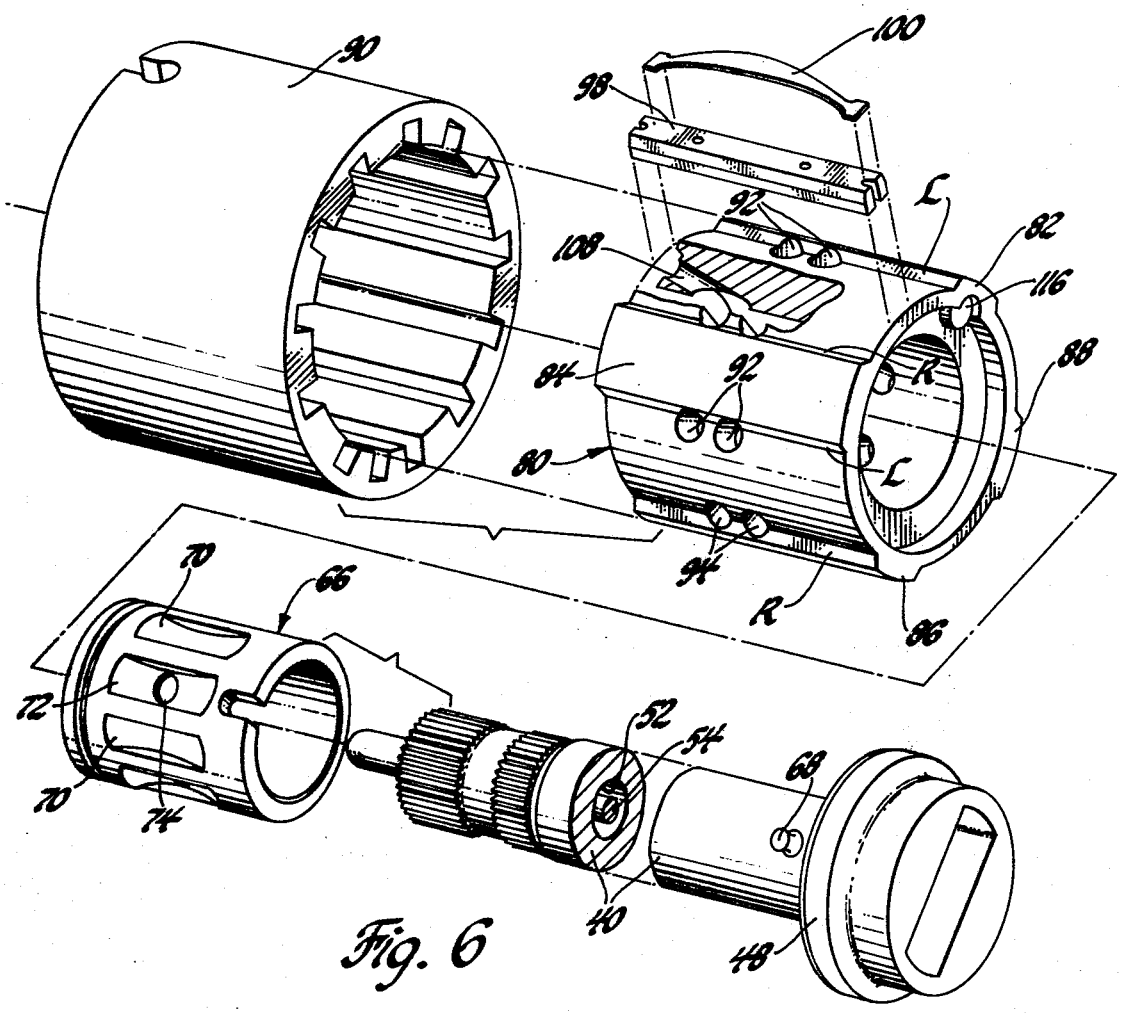
FIG. 6 is an exploded perspective view of a portion of the hydraulic motor and valve of the power steering unit of this invention.

Disposed around the inner end of stub shaft 40 and within the cavity formed by the housing 44 is a cylindrical open center valve element 66 which is fastened to the stub shaft by radial pin 68 so that it rotates therewith. As best shown by FIGS. 3 and 6, the cylindrical valve element 66 has a plurality of longitudinally extending and evenly spaced grooves 70 and 72 dished into the outer periphery of the valve element for directing fluid flow in the servo motor as will be further explained below. The valve element has centralized radial passages 74 leading to alternating grooves 72 as best shown in FIG. 4.

Disposed concentric with respect to the valve element 66 is a cylindrical rotor 80 which is rotatably mounted in housing 42 on the cylindrical valve element 66. Flat end plates 79 and 81 providing dynamic sealing are mounted in the housing at opposite ends of the rotor to close the ends of the fluid receiving pockets of the rotor described below. The rotor is formed with a plurality of arcuately spaced and radially projecting lobes 82, 84, 86 and 88. As shown, the spaced lobes of rotor 80 engage the inner annular surface of a fixed cylindrical stator 90 keyed or otherwise secured to plate 91 which is in turn secured to housing 42. A plurality of radially extending passages 92 and 94 formed in rotor 80 lead from the valve element 66 to the pockets 96 formed between adjacent lobes.

The stator 90 has a plurality of vanes or slippers 98 each mounted in an accommodating longitudinally and radially extending recess formed in the stator. Each slipper is backed by a leaf spring 100 which yieldably urges the associated slipper 98 radially inwardly into continuous contact with the outer periphery of the rotor 80 and its lobes. As a lobe contacts a slipper, it will be forced radially outwardly further into its recess while maintaining its sealing function. As the lobe passes a slipper, its spring biases the slipper inwardly to maintain its sealing engagement with the periphery of the rotor and to separate the pockets 96 into pressure chambers 101 and 103 respectively as illustrated by FIG. 4 and as will be later explained.

The rotor is fed with high pressure fluid from a conventional power steering pump such as disclosed in the U.S. Pat. No. 3,022,772 to B. P. Ziegler et al for "Rotary Power Steering Valve with Torsion Bar Centering". Fluid from the pressure source is supplied to an inlet passage 102 formed in the housing 124. This high pressure oil flows through the circumferential space 104 between the stator 90 and the interior of housing 42 and around a needle bearing assembly 106 mounted in the upper end of housing 42. From space 104 oil flows through the bearing assembly 106 into a plurality of equally spaced and inwardly inclined passages 108 formed in the rotor 80 and, depending on rotation of valve element 66, into communication with either the slots 70 or 72 in response to predetermined rotation of the valve element 68. While the passages 108 in the rotor provides the inlet passages for fluid feed to the valve element, the radial passages 74 associated with grooves 72 in the valve element provide exhaust passages for the pressure fluid from the pockets 96 in rotor 80 and directly from fluid feed passages 108 under certain operating conditions such as illustrated in FIG. 2.

Fluid exhausted from the rotor 80 through the valve element 66 will flow in the annular space between the valve element and the stub shaft, through the slots 46 in the head portion 48 and then into a discharge port 112 formed in the housing 124. The head portion 48 of intermediate member 50 is secured to the rotor 80 by an axially projecting drive pin 116 and is drivingly connected to journal 118 rotatably supported by bearing 120 in a housing 124 of the rack and pinion assembly 16. As shown the servo housing 42 connects to housing 124 of the rack and pinion assembly. Intermediate member 50 further has a pinion gear 126 secured to journal 118 and is supported at its outboard end by shaft 128 and by bearing sleeve 130. Pinion gear 126 is conventionally toothed to engage the teeth of the elongated rack 18 which is underneath the pinion and projects laterally from the rack and pinion housing. A pressure shoe 132 is biased by a spring element 134 and urges the rack into yieldable engagement with the pinion gear. An adjustment screw 136 is threaded into the rack and pinion housing 124 to provide an adjustment for varying the spring force between the rack and pinion connection.

From the above, it will be appreciated that rotation of the pinion in a right turn direction will cause the rack to be laterally moved so that the tie rods are accordingly moved for right turn steering of the steering rods 30 and 32 and wheels 34 and 36 of the vehicle.

FIGS. 2 and 3 show the valve element 66 rotated by the steering shaft 14 to straightahead steering positions and ready for left or right power assist steering. In FIG. 2 pressure fluid supplied from the power steering pump to the inlet passage 102 is exhausted to outlet 112 via circumferential space 104, inclined passages 108 in the rotor, grooves 72 and radial passages 74 in the valve element. In FIG. 3, the valve element 66 has been rotated so that passages 108 in the rotor are aligned with grooves 70. As shown in this FIGURE, the grooves 70 feed pressure fluid to the radial passages 92 and 94 which are cracked or exhausted to grooves 72. With pockets 96 or pressure chambers 101 and 103 connected to the exhaust port there is no power input to the rack and pinion gear.

In the event the operator corners to the right the valve element 66 will be rotated a selected amount in a clockwise direction from the FIG. 3 position. Under such conditions, FIG. 4 for example, high pressure fluid supplied to grooves 70 will be fed to right turn pockets 103 in the rotor as provided by the contact of the slippers with the rotor intermediate lobes 82 and 84. Left turn pockets 101 will be opened to exhaust through the radial passages 74. Under such conditions fluid pressure exerts a force on right turn flanks R of lobes 82 and 84 and powers the rotor clockwise. With rotor 80 following rotation of the valve element, the pinion 126 will be powered by the hydraulically driven motor in a corresponding clockwise direction. This causes the rack to move outboard toward tire 34 for right turn steering. When steering input has stopped, the torsion bar centers the valve element to the FIG. 3 position to neutralize the power assist.

For power assisted left turn steering, the valve element 66 is turned by manual input in a counterclockwise direction so that left turn chambers 101 are pressurized and the right turn chambers 103 in the rotor are exhausted. Under these conditions fluid pressure on the left turn flanks L of the lobes turns the rotor in a counterclockwise direction. Inboard rack movement for left turn steering is accordingly hydraulically assisted by fluid power acting through the rotor and pinion. As in right turn steering, when input is stopped the torsion bar centers the valve element so that power steering is again temporarily terminated.

From the above, it will be seen that high pressure oil is directed by the spool to either the right or left side of the four lobes of the body of the rotor by loads applied to the stub shaft. The vanes are located close enough together so that oil cannot flow from or to the right side of one lobe to the left side of the next lobe. Because the flow is blocked by a vane, the high pressure oil acts on the left or right side of the lobe which causes it to turn and assist the input torque.

The vanes fit into their slots with some looseness but are held against the cam surface by their curved leaf springs. The looseness on the side of the vanes allow oil into and out of the cavities behind the vanes; however, when oil tries to flow across a vane the flow forces the vane to the low pressure side of the slot where it seals and limits leakage.

If the power steering system should lose hydraulic assist, the steering function is continued by manual steering so that the operator has full control of the vehicle. However, greater manual effort will be required to operate the steering mechanism.

While a preferred embodiment of this invention has been shown and described to illustrate the invention other embodiments will become apparent to those skilled in the art. Accordingly the scope of this invention is set forth in the following claims:

What is claimed is:

1. An integral power steering gear for steering the dirigible wheels of a vehicle comprising a rotary hydraulic servo, a housing for said servo, a rotatable stub shaft extending axially into said housing manually rotatable in clockwise and counterclockwise directions by a vehicle operator, said servo having an annular stator fixed in said housing and a hydraulically actuated rotor means rotatable in clockwise and counterclockwise direction within said stator, said rotor having a plurality of arcuately spaced lobes projecting radially therefrom into sealing engagement with said stator, a plurality of arcuately spaced sealing means yieldably mounted in said stator for yieldably contacting the outer periphery of said rotor means and said lobes allowing said rotor means to revolve in said stator, said sealing means cooperating with said lobes to form a plurality of pressure chambers in said servo, valve means disposed on said stub shaft and within said rotor means for directing operating fluid to and from said pressure chambers to produce a powered clockwise rotation of said rotor means in response to the manual clockwise movement of said stub shaft and a counterclockwise powered rotary movement of said rotor means in response to the manual counterclockwise rotary movement of said stub shaft, output means extending from said rotor means and drivingly connecting said servo to the dirigible wheels of the vehicle, and torsion spring means extending through said stub shaft and operatively connecting said rotor means to said valve means to center said valve means with respect to said rotor means and to exhaust said pressure chambers in response to termination of manual rotation of said stub shaft.

2. An integral power steering gear for the dirigible wheels of a vehicle comprising a rotary hydraulic servo, a housing for said servo, a rotatable stub shaft extending axially into said housing manually rotatable in clockwise and counterclockwise directions by a vehicle operator, said servo having a cylindrical stator fixed in said housing and a hydraulically actuated rotor means rotatable in clockwise and counterclockwise direction within said stator, said rotor means having a plurality of arcuately spaced lobes projecting radially outwardly therefrom into sliding sealing engagement with said stator, a plurality of arcuately spaced sealing means yieldably supported in said stator for sliding and sealing engagement with rotor and cooperating with said lobes to form a plurality of pressure chambers in said servo, fluid flow control valve means secured to said stub shaft on said housing rotatably supporting said rotor means for directing fluid to and from said pressure chambers to produce a powered clockwise rotation of said rotor means and the yielding movement of said sealing means with respect to said stator in response to the manual clockwise movement of said stub shaft and valve means and a counterclockwise powered rotary movement of said rotor means in response to the manual counterclockwise rotary movement of said stub shaft and valve means, output means extending from said rotor means and drivingly connecting said rotor means to the dirigible wheels of the vehicle, and torsion spring means extending through said stub shaft and operatively connected to said rotor means for spring loading said stub shaft and valve means with respect to said rotor means so that said valve means is turned to a centered position relative to said rotor means in response to termination of manual rotation of said stub shaft to exhaust said pressure chambers to thereby cause power assist steering to terminate.

3. An integral power steering gear for steering the dirigible wheels of a vehicle comprising a hydraulic servo, a housing for said servo, a rotatable stub shaft extending axially into said housing manually rotatable in clockwise and counterclockwise directions by a vehicle operator, a cylindrical stator, hydraulically actuated rotor means mounted for at least one full revolution within said stator, sealing means yieldably mounted in said stator for contacting the periphery of said rotor means to form a plurality of fluid pressure chambers and to allow said rotor to rotate in said stator, said rotor means being rotatable in clockwise and counterclockwise directions across said yieldable sealing means, fluid control valve means mounted within said rotor means for directing fluid to and from said pressure chambers to produce a powered clockwise rotation of said rotor means in response to the manual clockwise movement of said valve means and a counterclockwise powered rotary movement of said rotor means in response to the manual counterclockwise rotary movement of said valve means, rack and pinion means operatively connected to said rotor means and drivingly connecting said servo to the dirigible wheels of the vehicle, and torsion spring means extending through said stub shaft and operatively connecting said rotor means to said stub shaft and valve means for spring loading said valve means to center said valve means with respect to said rotor means so that said rotor means is neutralized in response to termination of manual rotation of said stub shaft, said valve means comprising a valve element having a plurality of alternating input and discharge passages hydraulically connected with said rotor means and drive means connecting said stub shaft to said valve element so that rotation of said stub shaft and said valve element in either direction will operatively connect said input and discharge passages to said rotor means to thereby produce a hydraulically powered rotation of said rotor means and said output that corresponds to the direction of rotation of said stub shaft.

4. A rotary hydraulic servo for a power steering gear comprising a stationary housing, a rotatable stub shaft extending axially into said housing, a stator having a cylindrical internal wall mounted in said housing concentric with said stub shaft, a rotatable output extending from said housing, a rotor rotatably mounted within said stator drivingly connected to said output, said rotor having a plurality of lobes circumferentially spaced from each other and extending radially outwardly therefrom into contact with the internal wall of said stator to provide a plurality of recesses therein, a plurality of vanes circumferentially spaced from each other in said stator, spring means for biasing said vanes into contact with the periphery of said rotor, said vanes being located at predetermined circumferential distances from each other to separate each of said recesses into first and second pressure chambers between adjacent lobes, said housing having input passage means for conducting pressure fluid into said servo and output passage means for conducting discharge fluid from said servo, a valve element secured to said stub shaft for rotary movement therewith and operatively disposed between said stub shaft and said rotor, said valve element having a plurality of alternating input and discharge passages hydraulically connected with said rotor, and drive means connecting said stub shaft to said valve element so that rotation of said stub shaft and said valve element in either direction will connect a high pressure to a corresponding one of said chambers of each of said recesses while opening the other of said chambers of each of said recesses to the output passage to thereby produce a hydraulically powered rotation of said rotor and said output that corresponds to the direction of rotation of said stub shaft.

* * * * *